Figure 1:
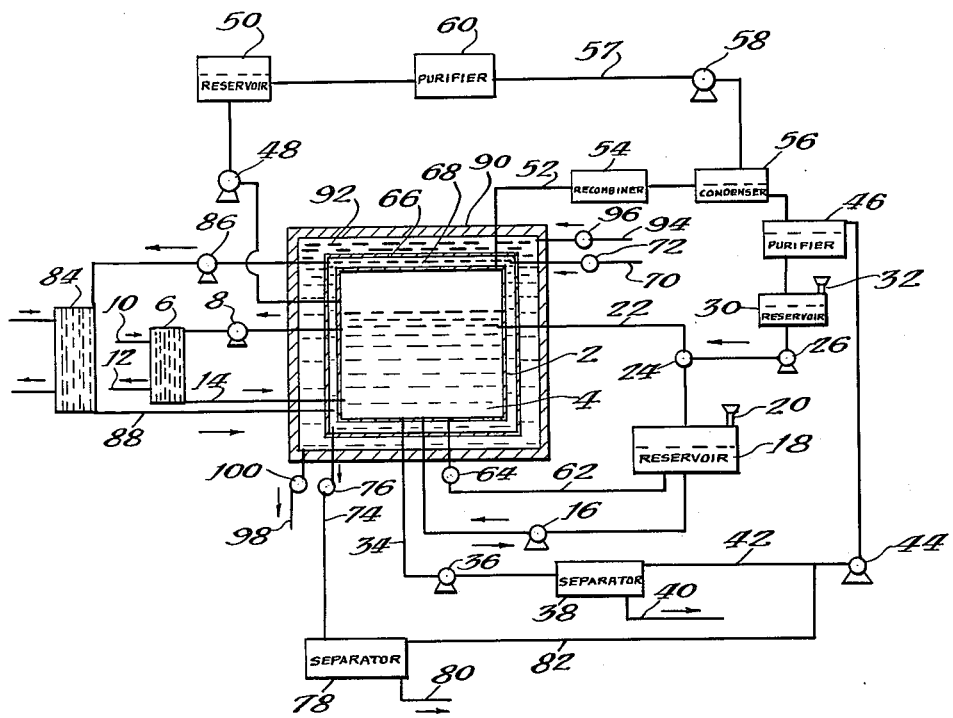

United States Patent Office 2,986,510
Patented May 30, 1961

2,986,510

MASSIVE LEAKAGE IRRADIATOR

Eugene P. Wigner, Princeton, N.J., Leo Szilard, Chicago, Ill., Robert F. Christy, Santa Fe, N. Mex., and Francis Lee Friedman, Chicago, Ill., assignors to the United States of America as represented by the United States Atomic Energy Commission Filed May 14, 1946, Ser. No. 669,524

1 Claim. (Cl. 204—193.2)

This invention relates to neutronic reactors and to novel articles of manufacture used in and in combination with such reactors. In neutronic reactors a neutron fissionable isotope such as $U^{233}$, $U^{235}$, or $94^{239}$ or mixtures thereof is subjected to fission by absorption of neutrons, and a self-sustaining chain reaction is established by the neutrons evolved by the fission. In general such reactors comprise bodies of compositions containing such fissionable material, for example, natural uranium, disposed in a neutron slowing material which slows the neutrons to thermal energies. Such a slowing material is termed a neutron moderator. Carbon, beryllium, and $D_2O$ (heavy water) are typical moderators suitable for such use. Heat is evolved during the reaction which is removed by passage of a coolant through the reactor or in heat exchange relationship therewith. Specific details of the theory and essential characteristics of such reactors are set forth in copending application of Enrico Fermi and Leo Szilard, Serial No. 568,904, filed December 19, 1944, now Patent No. 2,708,656.

This invention is particularly concerned with neutron bombardment of various target isotopes. As the result of such bombardment, many substances absorb neutrons to form various useful isotopes. For example, radioactive atoms may be prepared by fission or neutron absorption which may be used as tracers in chemical and biochemical or biological work. Moreover, fissionable isotopes such as $U^{233}$ may be produced by neutron bombardment of an isotope such as $Th^{232}$.

While a neutronic reactor is an excellent source of neutrons, the problem of using neutrons developed in a reactor for bombardment of target isotopes frequently is rather difficult. Insertion of neutron absorbing target isotopes directly into a neutronic reactor for bombardment purposes offers certain difficulties since the neutron absorption of the inserted isotope may be so great that the chain reaction is stopped unless but a limited amount of such isotope is inserted.

In accordance with the present invention, it has been found that a target isotope or target isotopes may be bombarded with neutrons from a neutronic reactor by disposing the isotope to be irradiated around the exterior of the reactor in association with a neutron moderating or scattering material. In such a process the problem of stopping the reaction is minimized and neutrons which might otherwise be lost are used in the bombardment.

The target isotope or compositions containing such isotope may be disposed as a more or less uniform suspension or dispersion in the neutron moderator. Thus a solution or slurry of the target isotope in a liquid moderator may be used for this purpose. Alternately lumps or granules of the target isotope or a composition containing this isotope may be dispersed in a moderator which may be solid or liquid.

Figure 2:
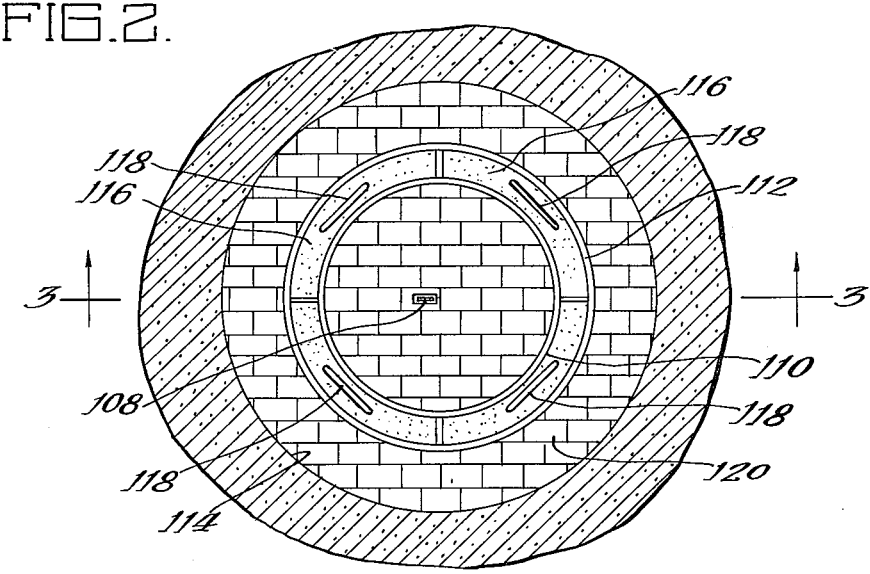
Figure 3:
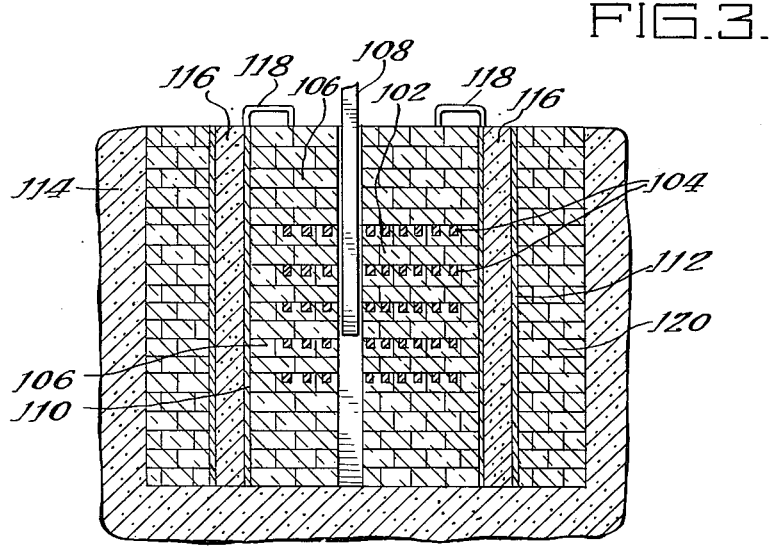

Thus an object of this invention is to provide a novel means for bombarding substances with neutrons. Other objects and advantages of the invention will become apparent by reference to the following disclosure and the accompanying drawings in which Fig. 1 is a flow diagram showing the invention as embodied in a system wherein the reactive composition as well as the bombarded composition is in fluid form;

Fig. 2 is a diagrammatic plan view of a system with the upper portion of the shield broken away wherein the reactive composition and the bombarded composition are solid in form; and Fig. 3 is a sectional view taken on the line 3—3 of Fig. 2.

In order that a self-sustaining neutronic chain reaction can be established and maintained, the losses of neutrons must be held to a value so low that at least one neutron is available for a new fission, after losses have been deducted, per neutron consumed in production of fission. In fission of $U^{235}$ and similar isotopes, more neutrons are evolved per fission than are required to produce the fission. For example, about 2.3 neutrons are evolved per neutron consumed in fission of $U^{235}$, and about 2.8 neutrons are evolved per neutron consumed in fission of $94^{239}$. These evolved neutrons are used up in fission of further $U^{235}$ or $94^{239}$ atoms or are lost. If losses do not reduce the ratio of neutrons evolved to neutrons consumed or lost below one, the chain reaction will continue.

Losses may be external, as when neutrons escape from the reactor, or internal. Internal losses are caused by absorption of neutrons by atoms which do not fission when the neutron has been absorbed.

$U^{238}$ present in natural uranium absorbs substantial quantities of neutrons to produce $94^{239}$. This loss may be substantially reduced by use of uranium aggregates. Thus, it has been found that $U^{238}$ absorbs neutrons to an appreciable degree at energies (resonance energies) greater than thermal energies due to its relatively high capture cross-section with respect to that of $U^{235}$ at such resonance energies. However, this type of absorption, known as resonance absorption, may be reduced by decreasing the amount of neutrons which pass into a uranium body until these neutrons have been slowed to thermal energy. This may be done by reducing the ratio of surface area per unit weight of uranium, i.e., by using natural uranium in the form of aggregates preferably having a minimum thickness of about 0.5 cm. Moreover, this loss may be rendered negligible by use of a concentrate of a fissionable isotope which contains greater than natural concentration of fissionable material.

Neutron moderators also absorb neutrons. Generally speaking, it is desirable to use as a moderator an element (or compound thereof) of low atomic weight and low neutron capture cross-section. The ability to slow down neutrons may be expressed by what is known as the scattering cross-section whereas the ability to absorb or capture neutrons may be expressed as the capture cross-section. The ratio of absorption cross-section to scattering cross-section of various materials are approximately as follows:

| | |
|---|---|
| Light water ($H_2O$) | 0.00478 |
| Diphenyl | 0.00453 |
| Beryllium | 0.00127 |
| Graphite | 0.000726 |
| Heavy water ($D_2O$) | 0.00017 |

For natural uranium it is preferred to use materials wherein the above ratio is below about 0.004. However, with enriched uranium compositions containing more than natural amounts of $U^{235}$, a greater latitude is permissible. Using carbon or deuterium oxide as moderators and natural uranium as the fissionable composition, only about 1.1 or 1.3, respectively, neutrons are obtained per neutron consumed due to neutron losses in the $U^{238}$ and the moderator. Since the external neutron losses may be substantial, other internal neutron losses should be held sufficiently low to prevent these losses from rising so high as to prevent the reaction.

Other components of the reactor including the coolant, impurities in the uranium or other portions of the system, moderator, control or limiting rods, fission fragments, restraining barrier, etc. absorb neutrons in varying amounts depending upon their neutron capture cross-section.

The effect of these impurities or absorbers in a reactor containing natural uranium as the fissionable component has been approximately evaluated for each element as a danger coefficient. This coefficient is computed according to the formula $$\frac{\sigma_i}{\sigma_u} \cdot \frac{A_u}{A_i}$$

where $\sigma_i$ represents the cross-section for absorption of thermal neutrons of the impurity;

$\sigma_u$ represents the cross-section for absorption of thermal neutrons of the uranium;

$A_i$ represents the atomic weight of the impurity of neutron absorber; and $A_u$ represents the atomic weight of uranium.

The following table gives presently known values for various elements having their natural isotopic content.

| Element | Danger Coefficient | Element | Danger Coefficient |
|---|---|---|---|
| $H^1$ | 10 | Mo | 1.0 |
| $D^2$ | 0.01 | Ru | ~2 |
| He | 0 | Rh | 50 |
| Li | 310 | Pd | ~2 |
| Be | 0.04 | Ag | 18 |
| B | 2,150 | Cd | 870 |
| C | 0.012 | In | 54.2 |
| N | 4.0 | Sn | 0.18 |
| O | 0.002 | Sb | 1.6 |
| F | 0.02 | Te | 1 |
| Ne | <3 | I | 1.6 |
| Na | 0.65 | Xe | <6 |
| Mg | 0.48 | Cs | 8.7 |
| Al | 0.30 | Ba | 0.30 |
| Si | 0.26 | La | <2.4 |
| P | 0.3 | Ce | <2.4 |
| S | 0.46 | Pr | <2.4 |
| Cl | 31 | Nd | ~17 |
| A | ~0.8 | Sm | ~1430 |
| K | 2.1 | Eu | 435 |
| Ca | 0.37 | Gd | ~6320 |
| Sc | <7 | Tb | ~20 |
| Ti | 3.8 | Dy | ~200 |
| V | 4 | Ho | ~10 |
| Cr | 2 | Er | ~40 |
| Mn | 7.5 | Tm | ~20 |
| Fe | 1.5 | Yb | ~10 |
| Co | 17 | Lu | ~30 |
| Ni | 3 | Hf | ~20 |
| Cu | 1.8 | Ta | 4.6 |
| Zn | 0.61 | W | 2.7 |
| Ga | ~1 | Re | ~18 |
| Ge | (<5) | Os | <1.7 |
| As | 2 | Ir | ~70 |
| Se | 6.3 | Pt | ~2.5 |
| Br | 2.5 | Au | 16 |
| Kr | <6 | Hg | 82 |
| Rb | ~0.4 | Tl | 0.5 |
| Sr | 0.57 | Pb | 0.03 |
| Y | 0.4 | Bi | 0.0025 |
| Zr | ~0.13 | Th | 1.1 |
| Cb | <0.4 | | |

From the above it will be apparent that certain elements such as cadmium, boron and gadolinium absorb neutrons to a very high degree and if present in substantial amount will stop the reaction. On the other hand, larger amounts of other materials may be present. In any case, however, only a limited amount of impurities and target isotopes may be present within the reactor in order to secure a chain reaction.

From the above it will be apparent that for a neutron chain reaction to remain self-sustaining the equation $$n-x-y-z-L \geq 1$$

where $n$ = number of neutrons evolved by a fission of a fissionable isotope per neutron consumed by such isotope.

$x$ = number of neutrons absorbed by a non-fissioning isotope such as $U^{238}$ in formation of a fissionable isotope per neutron consumed in fission.

$y$ = number of neutrons absorbed by the moderator per neutron consumed in fission.

$z$ = number of neutrons absorbed by other neutron absorbers per neutrons consumed in fission.

$L$ = number of neutrons lost by leakage per neutron consumed in fission.

Thus, with $U^{235}$ the sum of $x+y+z+L$ cannot exceed about 1.3 and with $94^{239}$ cannot exceed about 1.8.

The ratio of the fast neutrons produced in one generation by the fissions to the original number of fast neutrons producing the fission in a system of infinite size from which there can be no loss is called the reproduction factor and is denoted by the symbol $k$. The $k$ constant of a system of finite size is the reproduction factor which the system would have if expanded to infinite size. Usually this constant is expressed without regard to localized neutron absorbers such as control or limiting rods, which are not uniformly dispersed throughout the entire system. The neutron reproduction ratio ($r$) is an actual value for a finite system, and differs from $k$ by a factor due to loss of neutrons through leakage and through absorption by localized neutron absorbers. To maintain a chain reaction, $r$ must be at least equal to one. As pointed out in the above-mentioned Fermi-Szilard application, it is preferably maintained below about 1.01 during operation of the reactor.

Computation of $k$ for any system may be determined experimentally in accordance with methods described in co-pending application of E. Fermi, Serial No. 534,129 filed May 4, 1944, entitled "Nuclear Chain Reacting System," now Patent 2,780,595, dated February 5, 1957.

The reproduction ratio ($r$) may be ascertained by observation of the rate of increase of neutron density. It may also be predicted by computation of losses due to local absorbers or leakage which may be deducted from $k$ to secure this value. In such a case allowance for leakage is made depending upon the size of the reactors. For reactors of practical size, leakage usually amounts to about 0.01 to 0.3 $k$ units depending upon the amount by which the $k$ of the system exceeds one. Loss due to other absorbers may be computed by computation of the danger sum as heretofore described.

The reactor diagrammatically illustrated in Fig. 1 comprises a suspension such as a solution or slurry of a fissionable material in a liquid moderator. For example, a solution of uranyl sulphate in water is chain reacting where the solution fills a spherical reactor 12 inches in diameter and surrounded with an efficient neutron reflector and where the reactor contains at least 575–600 grams of $U^{235}$ as a uranium concentrate containing about 15% $U^{235}$ based upon the total uranium. Higher amounts of $U^{235}$ for example 600–700 or more grams are required where the reflector contains a target isotope as in the present instance. Moreover, other solutions such as solutions of uranyl fluoride, uranyl nitrate, plutonyl sulphate ($PuO_2SO_4$) may be used where the fissionable isotope content of the plutonium or uranium is above about 5–15% of the uranium or equivalent composition. In addition, natural uranium compounds (uranyl fluoride $UO_2$ or $U_3O_8$) may be dispersed or dissolved in heavy water ($D_2O$) to establish a chain reaction.

The shape of the reactor may be cylindrical as shown by the drawings or may be spherical or other form. A slender elongated cylinder is particularly advantageous where maximum leakage is desired in order to secure a maximum of neutrons for bombardment of the target isotope or isotopes.

In Fig. 1 a reactor tank or chamber 2 of low neutron absorbing material, for example stainless steel or aluminum, is provided. This tank is sufficiently thin (for example ⅛ inch or less) to permit passages of neutrons therethrough without substantial absorption of neutrons. The tank contains a chain reacting liquid composition 4 such as above mentioned.

The reactive composition is continuously circulated through a heat exchanger 6 by means of a pump 8 having its suction side connected to the tank 2. The discharge side of the pump is connected to the heat exchanger 6 through which the reactive composition is passed in heat exchange relationship with a coolant circulated through the heat exchanger by inlet and outlet pipes 10 and 12. The cooled composition is returned to the tank 2 through a return line 14.

The amount of reactive composition within the tank 2, as well as the concentration of uranium-containing material in the composition, is controlled by a system including a reversible delivery pump 16 connected to the bottom of the tank 2 and to a reservoir 18 having an inlet 20 to accommodate the introduction of uranium-containing material into said reservoir 18. The reservoir 18 is connected to the tank 2 through a line 22 having a conventional three-way operating valve 24 connected to the discharge side of a pump 26, the suction side of which is connected to a moderator reservoir 30 having an inlet 32 through which moderator may be conveyed to this reservoir.

The reactive composition 4 is continuously withdrawn from the bottom of the tank 2 through an outlet line 34 connected to the suction side of a pump 36, the discharge side of which is connected to a conventional separator device 38 adapted to separate the moderator from the uranium-containing material. Such a separator may comprise an evaporator or settling tank and the separated material may be conveyed from the device 38 by an outlet line 40 for recovery of 94 and fission products formed as a result of the neutronic reaction where natural uranium or $U^{235}$-$U^{238}$ mixtures are used within the tank 2. Separated moderator is conveyed from the separator device 38 through a line 42 including a pump 44, the discharge side of which is connected to a moderator purifier 46 from which the purified heavy water is conveyed to the before-mentioned reservoir 30. The purification may be effected by various means such as by distillation.

It will be understood that the water within the tank 2 is continuously decomposed into $D_2$ and $O_2$ or $H_2$ and $O_2$, depending upon the type of water used, as a result of the neutronic reaction; and these decomposition products, as well as gaseous fission products of the reaction, are swept from the tank 2 and the decomposition products are recombined. A gas pump or blower 48 is provided having its suction side connected to a helium reservoir 50, and its discharge side connected to the tank 2 above the level of the reactive composition therein. The helium passes through the tank 2 and is conveyed therefrom by an outlet line 52 connected to a conventional recombiner device 54 adapted to recombine the hydrogen isotope or isotopes and $O_2$ into vaporized $D_2O$ or $H_2O$ which is conveyed to a condenser 56, the condensed $D_2O$ or $H_2O$ being conveyed to the before-mentioned purifier tank 46. Helium is conveyed from the condenser 56 by a line 57, preferably including a pump or blower 58, to a helium purifier tank 60 for removal of radioactive impurities and thence to the helium reservoir 50.

An emergency dump line 62 is connected to the tank 2 and the reservoir 18, said line including a dump valve 64 adapted to be opened under emergency conditions to reduce the body of composition 4 within the tank 2 to a size smaller than that at which a chain reaction may be sustained.

It may be noted that the system, thus far disclosed, is purely illustrative and such systems are more fully described in copending application, Serial No. 613,356, filed August 29, 1945 in the United States Patent Office by Eugene P. Wigner, Leo A. Ohlinger, Gale J. Young and Harcourt C. Vernon and also in an application of Robert F. Christy, Serial No. 623,363 filed October 19, 1945, now Patent 2,843,543, dated July 15, 1958.

Surrounding the tank 2 is another tank or chamber 66 within which is a production area or zone containing a fluid composition 68 to be bombarded by neutrons emanating from the reactor 2. This tank also is constructed of a low neutron absorber such as aluminum or stainless steel or other material having a danger coefficient below 10 and having a thickness, e.g. ⅛ inch or less, sufficiently low to prevent substantial neutron absorption by the tank 66. The composition 68 may be a slurry or solution of the neutron absorbent material in a neutron moderator such as heavy water, said composition being admitted to the chamber 66 through an inlet line 70 including a conventional shut-off valve 72. After the composition 68 has been bombarded for the desired length of time, it is conveyed from the chamber 66 by an outlet line 74 including a conventional drain valve 76 to a conventional separator device 78 adapted to separate the heavy water from the neutron absorbent material which has at this point been converted to a radioactive isotope by the capture of neutrons as above discussed. The radioactive material is conveyed from the separator 78 by a line 80, and the separated moderator is conveyed from the device 78 by a line 82 connected to the suction side of the before-mentioned pump 44 which thus urges the heavy water from the line 82 to the before-mentioned purifier tank 46. It will be understood that the presently illustrated system will be used when the same moderator is used in tanks 2 and 66 and that where different moderators are used different purifiers may be required.

The bombarded composition 68 is preferably circulated through a heat exchanger 84 by a pump 86 having its suction side connected to the chamber 66, the cooled composition being returned to the chamber 66 through a return pipe or line 88.

The chambers 2 and 66 are disposed within an aluminum or steel tank or chamber 90 containing a heavy water neutron reflector 92 adapted to reflect escaping neutrons back into the chamber 66 and/or reactor 2. The heavy water 92 is conveyed to the chamber 90 through an inlet line 94 having a conventional shut-off valve 96 and is conveyed from the tank by an outlet line 98 having a conventional drain valve 100.

Thus, it will be understood that by the above described system a novel method and means have been provided for surrounding a neutronic reactor with a fluid composition to be bombarded by neutrons escaping from the periphery of the reactor, said composition including a neutron scattering or reflecting material combined with a neutron absorbent material adapted to be converted to a radioactive isotope by absorption of neutrons.

Referring now to Figs. 2 and 3, the neutronic reactor diagrammatically shown therein comprises a body of neutron moderator 102, preferably in the form of graphite or beryllium oxide blocks, in which are disposed a plurality of spaced lumps or slugs 104 (Fig. 3), of uranium-containing material, the portion of the graphite outwardly of the slugs constituting a reflector 106 (Fig. 3) for reflecting a substantial number of the escaping neutrons back into the central portion of the reactor. A control rod 108 of highly neutron absorbent material, such as cadmium or boron, extends through a complementary slot in the reactor to accommodate control of the neutron density therein as more fully brought out in the Fermi-Szilard application above-mentioned.

The reactor is contained within a tank or chamber 110 which, in turn, is disposed within a tank or chamber 112, both of these tanks being constructed of neutron permeable material such as aluminum and being contained within a concrete vault 114. The space between the tanks 110 and 112 is filled with a plurality of blocks 116, 116 composed of material to be bombarded by neutrons emanating from the reactor, each of these blocks being provided with a handle 118 to facilitate insertion and removal thereof. The blocks 116, 116 are preferably formed of graphite or other solid moderator material mixed with a neutron absorbent material to be converted to a radioactive isotope by absorption of neutrons.

Within the vault 114 around the tank 112 is a reflector 120 preferably formed of blocks or graphite, said reflector functioning to reflect escaping neutrons back into the blocks 116, 116 thereby increasing the rate of neutron absorption by the blocks. Thus, it will be understood that in the embodiment illustrated in Figs. 2 and 3, the neutronic reactor is surrounded by inner and outer reflectors 106 and 120 with a layer of material 116 of bombarded material interposed between the inner and outer reflectors. The inner reflector 106 functions to reduce neutron leakage from the exterior of the reactor; and thus, the reactor is capable of sustaining a chain reaction even though it is somewhat smaller than the critical size at which such a reaction would normally be possible without the use of such a reflector. The reflector 120 serves to reflect escaping neutrons back into the blocks 116, 116, thereby increasing the rate of neutron absorption by the bombarded material.

It is, of course, obvious that numerous variations are available without departure from the scope of the invention. For example, the air or water cooled graphite moderated neutronic reactor described in the aforementioned Fermi-Szilard application may be used to generate neutrons for bombardment as herein contemplated. A typical reactor of this type comprises a cube of graphite provided with holes extending horizontally therethrough provided with means to circulate water through the holes and having metallic uranium bodies therein. The holes are lined with aluminum pipe and the uranium jacketed with an aluminum sheath.

The principal dimensions of the reactor are as follows:

Axial length of active cylinder of reactor=7 meters
Radius of active cylinder of reactor=4.94 meters
Total weight of uranium metal in rods=200 metric tons
Weight of graphite in reactor=850 metric tons
Radius of uranium metal rods=1.7 centimeters
Thickness of aluminum jackets=0.5 millimeter
Thickness of aluminum pipe=1.5 millimeters
Thickness of liquid layer=2.2 millimeters with water or 4 millimeters of diphenyl
Number of rods in reactor=1695
Weight of aluminum in reactor=8.7 metric tons
Rod spacing in square array=21.3 centimeters As a further modification, a neutronic reactor containing aggregates of uranium and moderated with deuterium oxide may be constructed using a tank of aluminum 6 feet in diameter and 7 feet 4 inches high. In one such reactor 136 rods of uranium metal 1.1 inches in diameter and having an aluminum jacket 0.035 inch thick are mounted vertically in the tank to extend to within ¼ inch from the bottom of the tank. The ractor is surrounded with a 12 inch reflector of graphite. When 122.4 centimeters of $D_2O$ containing less than 1 percent $H_2O$ is placed in the tank, the reactor reaches critical size. When 124.7 centimeters of $D_2O$ is introduced, the time for doubling of the neutron density therein is about 6.5 seconds. A dispersion of the target material and moderator may be disposed about this type of reactor in place of the graphite reflector or in conjunction therewith and bombardment of the target isotope thereby obtained.

While the bombardment preferably is conducted using a target material disposed in a neutron slowing material, this is unnecessary particularly where a neutron reflecting layer is interposed between the active portion of the reactor and the material bombarded. Thus, since the graphite section 106 serves as a neutron reflector, the blocks 116 may consist substantially entirely of the material to be subjected to bombardment.

Various materials may be bombarded. For example, graphite bodies may be bombarded to increase their electrical resistance, thermal conductivity and elastic modulus or to remove impurities such as boron. Various isotopes may be bombarded to form other isotopes. For example, thorium 232 may be bombarded to form $U^{233}$. Other elements such as sulphur, phosphorus, boron, cadium or compounds thereof may be irradiated as will be understood by the art. Deuterium oxide containing one or more percent of light water may be bombarded to convert the light water to heavy water at least to a substantial degree. Where a neutron moderator is used in combination with the target material the moderator preferably should have a neutron absorption cross section less than that of the target material.

While the theory of the nuclear chain fission mechanism in uranium set forth herein is based on the best presently nown experimental evidence, the invention is not limited thereto, inasmuch as additional experimental data later discovered may modify the theory disclosed. Any such modification of theory, however, will in no way affect the results to be obtained in the practice of the invention hereindescribed and claimed.

Obviously, many modifications may be made in the specific embodiments disclosed without departing from the intended scope of the invention.

What is claimed is:

A massive leakage irradiator comprising a central core of thermal neutron fissionable material and moderating material, and a reflector free of fissionable material, the said central core in the shape of a solid cylinder and the reflector composed of a first zone and a second zone, said first zone being in the form of a first hollow cylinder with open ends immediately and coaxially surrounding the solid cylinder of the core along the entire length of its curved side and composed of cylinder segments with handles embedded in their upper surface, and the second zone being in the form of a second hollow cylinder with open ends of the same height as the first hollow cylinder and the solid cylinder of the core immediately and coaxially surrounding the first hollow cylinder along the entire length of its curved side, the first hollow cylinder containing reflecting material intermixed with material to be irradiated, and the second hollow cylinder being composed only of reflecting material, whereby the massive leakage of neutrons through the exterior curved side of the cylinder of the core may be utilized for irradiation.

References Cited in the file of this patent

UNITED STATES PATENTS

| | | |
|---|---|---|
| 2,708,656 | Fermi | May 17, 1955 |

FOREIGN PATENTS

| | | |
|---|---|---|
| 861,390 | France | Oct. 28, 1940 |
| 114,150 | Australia | May 2, 1940 |
| 233,011 | Switzerland | Oct. 2, 1944 |
| 648,293 | Great Britain | Jan. 3, 1951 |

OTHER REFERENCES

Kelly et al.: Physical Review 73, 1135–9 (1948). Copy in Patent Office Library. (204/154.2).

A General Account of the Development of Methods of Using Atomic Energy (1940–1945). H. D. Smyth. For sale by Supt. of Documents, Washington, D.C. Pages 153, 177.